J. B. Cornell,
Vault Cover,

Nº 26,479. Patented Dec. 20, 1859.

Witnesses:
Z. C. Robbins
Wm Yocke AKee

Inventor:
John B Cornell

UNITED STATES PATENT OFFICE.

JOHN B. CORNELL, OF NEW YORK, N. Y.

CONSTRUCTION OF VAULT-LIGHTS.

Specification of Letters Patent No. 26,479, dated December 20, 1859.

*To all whom it may concern:*

Be it known that I, JOHN B. CORNELL, of the city, county, and State of New York, have invented a new and Improved Illuminating Plate or Sash whose component parts of glass and hard metal are combined with each other by an original and peculiar process; and I do hereby declare that the following is a full and exact description of said invention, reference being had to the accompanying drawings, which form a part of this specification.

Figure 1:
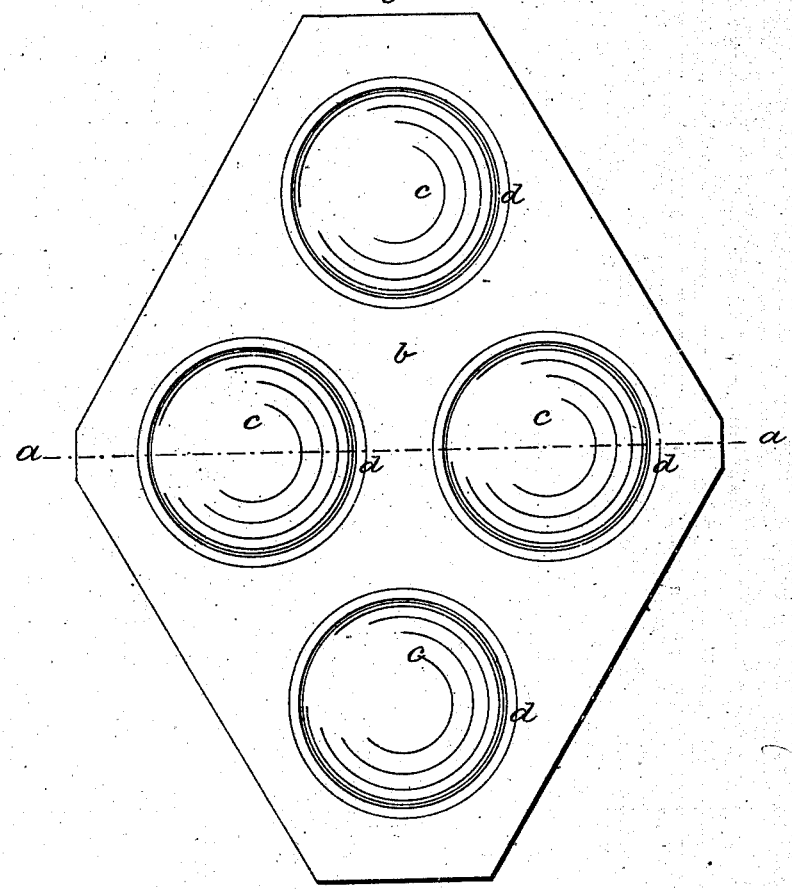
Figure 2:
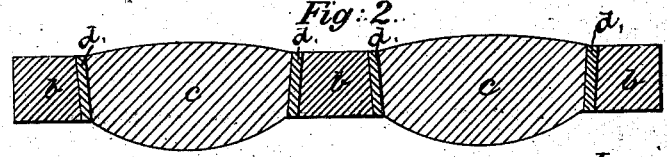

Figure 1, is a top view of one of my improved illuminating plates, and Fig. 2, is a section thereof in the line $a, a$, of Fig. 1.

Illuminating covers and plates which are constructed by inserting a series of glasses within the apertures of metallic plates, are liable to serious objections, and especially so when they are placed over openings in street-side-walks and other positions where they are exposed to knocks, blows, and other rough usage.

The radical defect in the aforesaid description of illuminating plates, grows out of the well known fact that it is impossible to form joints between the glass and iron portions of said plates of such a character as to prevent the glasses from working loose when the said plates are exposed to rough usage; and consequently, all the illuminating plates now in use, are constantly liable to have their water-proof qualities destroyed by the loosening or removal of their glasses.

To remedy the aforesaid serious defect in the old fashioned illuminating covers, and plates, is the object of my present invention.

My invention consists, first, in surrounding each one of any desired number of glasses with a thin band of iron, or some other suitable hard metal, then placing the glasses thus prepared in a mold of suitable shape, and then pouring a sufficient quantity of fused iron, or some other suitable metal, into said mold to embrace the peripheries of said glasses and fill the mold; by which process I produce an illuminating plate whose glasses cannot be loosened by any amount of legitimate rough usage, and which can not be either loosened or removed by foul means without great labor and the use of various instruments. Consequently, the said plate will be reliably water-proof, and the rigid embrace of the glasses by the metallic body of said plate, will give it a much greater degree of stiffness and strength, in proportion to its weight of metal, than can possibly be possessed by any other description of illuminating plates or sashes.

In the accompanying drawings $b$, is the metallic body of one of my improved illuminating plates; $c, c$, are the glasses in said plate; and $d, d$, are the hard metal bands surrounding the said glasses, which prepared them for their places within the mold and for the reception of the melted hard metal that forms the body of said illuminating plate.

One or any number of glasses of any desired size or shape, may be combined with a metallic plate of any desired size or shape, by my improved process of constructing illuminating plates and sashes.

What I claim as my invention and desire to secure by Letters Patent is—

Producing an improved illuminating plate by the process of combining the illuminating and the metallic portions of said plate with each other, substantially in the manner herein set forth.

The above specification of my improved illuminated plate or sash signed and witnessed this 11th day of November, 1839.

JOHN B. CORNELL.

Witnesses:
Z. C. ROBBINS,
WM. YORKE AT LEE.